United States Patent
Tange et al.

(10) Patent No.: US 7,236,870 B2
(45) Date of Patent: Jun. 26, 2007

(54) LANE KEEP CONTROL APPARATUS AND METHOD FOR AUTOMOTIVE VEHICLE

(75) Inventors: Satoshi Tange, Kanagawa (JP); Genpei Naito, Yokohama (JP); Shinji Matsumoto, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 156 days.

(21) Appl. No.: 10/798,407

(22) Filed: Mar. 12, 2004

(65) Prior Publication Data

US 2004/0186651 A1   Sep. 23, 2004

(30) Foreign Application Priority Data

Mar. 20, 2003   (JP) ............................... 2003-078661

(51) Int. Cl.
*G06F 19/00*   (2006.01)

(52) U.S. Cl. .................. 701/70; 701/301; 348/148

(58) Field of Classification Search .............. 701/70, 701/96, 300, 301; 348/148, 149; 342/454, 342/455; 340/436, 903; 303/121, 193; 180/170
See application file for complete search history.

(56) References Cited

U.S. PATENT DOCUMENTS

| | | | |
|---|---|---|---|
| 6,493,619 B2* | 12/2002 | Kawazoe et al. ............. 701/41 |
| 6,556,909 B2* | 4/2003 | Matsumoto et al. .......... 701/41 |
| 6,665,603 B2* | 12/2003 | Jindo et al. .................... 701/96 |
| 6,708,098 B2* | 3/2004 | Matsumoto et al. .......... 701/70 |
| 6,732,021 B2* | 5/2004 | Matsumoto et al. ........... 701/1 |
| 6,970,777 B2* | 11/2005 | Tange et al. ................... 701/41 |
| 6,970,787 B2* | 11/2005 | Matsumoto et al. ......... 701/301 |
| 6,973,380 B2* | 12/2005 | Tange et al. .................... 701/70 |
| 2003/0195667 A1* | 10/2003 | Tange et al. .................... 701/1 |
| 2004/0010371 A1* | 1/2004 | Matsumoto et al. ......... 701/300 |
| 2005/0125153 A1* | 6/2005 | Matsumoto et al. ......... 701/300 |
| 2005/0177308 A1* | 8/2005 | Tange et al. ................. 701/301 |
| 2005/0273262 A1* | 12/2005 | Kawakami et al. .......... 701/301 |

FOREIGN PATENT DOCUMENTS

| | | |
|---|---|---|
| JP | 11-96497 A | 4/1999 |
| JP | 2000-33860 A | 2/2000 |
| JP | 2000-272490 | 10/2000 |
| JP | 2001-310719 A | 11/2001 |
| WO | WO 01/32484 A1 | 5/2001 |

OTHER PUBLICATIONS

U.S. Appl. No. 10/798,405, filed Mar. 12, 2004, Tange et al.

* cited by examiner

*Primary Examiner*—Gary Chin
(74) *Attorney, Agent, or Firm*—Foley & Lardner LLP

(57) ABSTRACT

In lane keep control apparatus and method for an automotive vehicle, a deceleration controlled variable is calculated on the basis of a state of a tendency of a vehicular deviation from a traffic lane on which the vehicle is traveling and a braking force acted upon each of driven wheels of the vehicle is controlled on the basis of the calculated deceleration controlled variable.

22 Claims, 7 Drawing Sheets

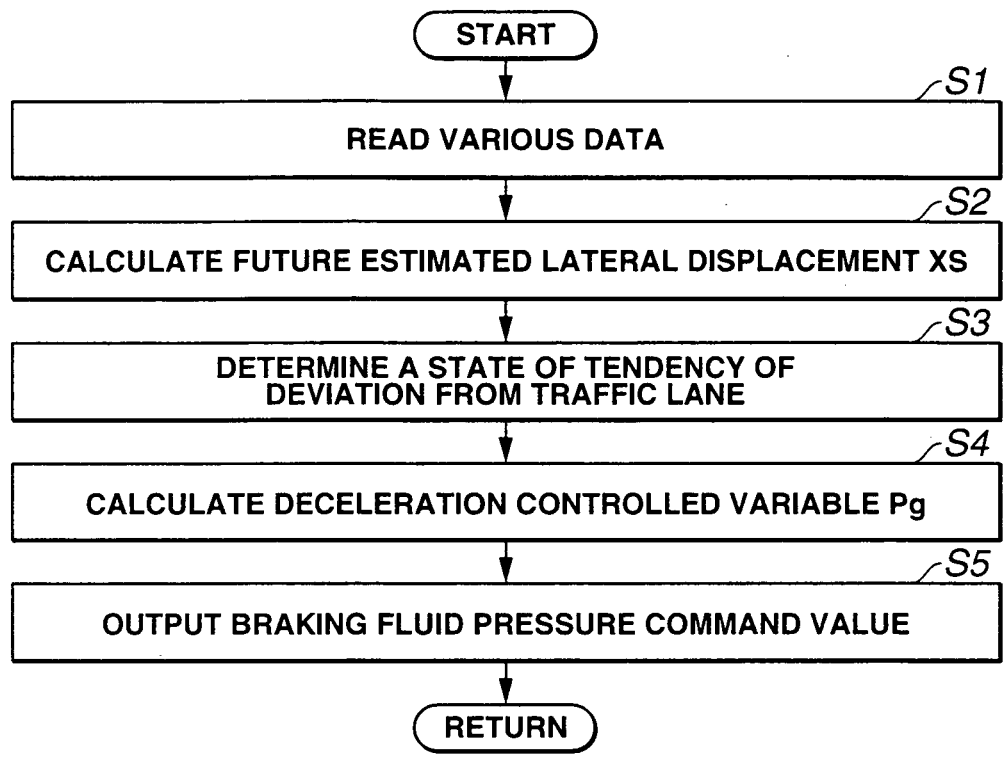
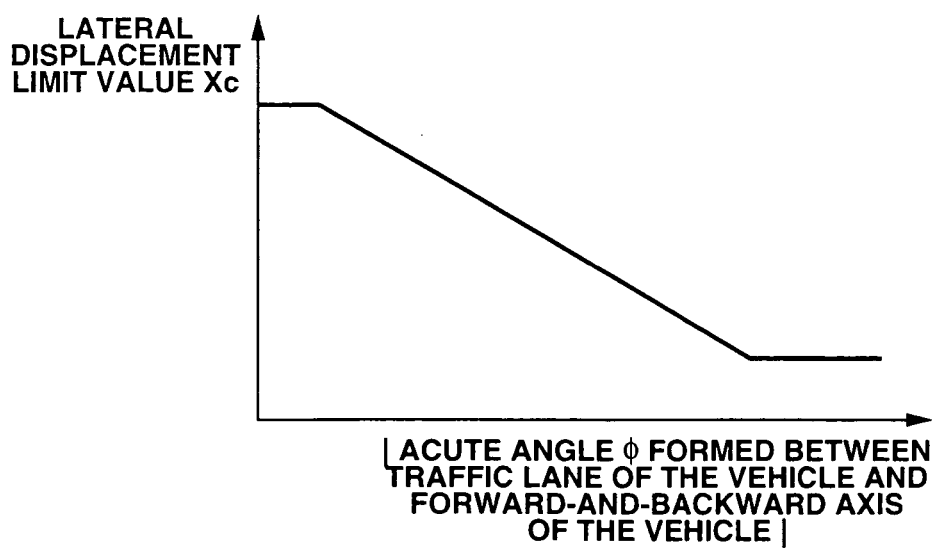

TRAFFIC LANE

TRAFFIC LANE

LANE KEEP CONTROL APPARATUS AND METHOD FOR AUTOMOTIVE VEHICLE

BACKGROUND OF THE INVENTION

1. Field of the Invention

The present invention relates to lane keep control apparatus and method for an automotive vehicle.

2. Description of the Related Art

A Japanese Patent Application First Publication No. Heisei 11-96497 published on Apr. 9, 1999 exemplifies a first previously proposed lane keep control apparatus for an automotive vehicle. In the first previously proposed lane keep control apparatus disclosed in the above-identified Japanese Patent Application First Publication, a steering torque is controlled to develop a yaw moment in a direction returning to a center position of a traffic lane on which the vehicle is traveling in accordance with a deviation quantity of a lateral displacement of the vehicle with respect to a center line of the traffic lane so as to prevent the vehicle from traveling under a deviation (a divergence) from the traffic lane (keep the vehicle in travel on the traffic lane).

In addition, a Japanese Patent Application First Publication No. 2000-33860 published on Mar. 20, 2003 exemplifies a second previously proposed lane keep control apparatus in which, when the vehicle is about to be deviated from the traffic lane on which the vehicle is to travel, the braking force acted upon each driven wheel is controlled to develop a yaw moment in the direction returning to the center line of the traffic lane on which the vehicle is traveling in accordance with the deviation quantity of the lateral displacement of the vehicle with respect to the center line of the traffic lane so as to prevent the vehicle from traveling with the deviation of the traffic lane (keep the vehicle travel within the same traffic lane).

SUMMARY OF THE INVENTION

However, in the above-described previously proposed first and second lane keep control apparatuses, controlled variables of a steering torque and of a braking force are limited. Hence, for example, when an acute angle formed between the traffic lane (a length direction of the traffic lane) on which the vehicle is traveling and a forward-and-backward axis of the vehicle is large (wide) and the deviation quantity of the lateral displacement of the vehicle with respect to the center line of the traffic lane has the tendency of a gradual increase, a yaw moment in accordance with the increase in the deviation quantity of the lateral displacement cannot be developed so that the vehicle has deviated from the traffic lane that the vehicle is naturally to travel.

It is, therefore, an object of the present invention to provide lane keep control apparatus and method for an automotive vehicle which can improve an avoidance performance of the deviation of the vehicle from the traffic lane on which the vehicle is traveling without giving a sense of incompatibility (a kind of unpleasant feeling) to the vehicle driver.

This can be achieved by providing a lane keep control apparatus for an automotive vehicle, comprising: deceleration controlled variable calculating section that calculates a deceleration controlled variable on the basis of a state of a tendency of a vehicular deviation from a traffic lane on which the vehicle is traveling; and braking force controlling section that controls a braking force acted upon each of driven wheels of the vehicle on the basis of the calculated deceleration controlled variable.

This can also be achieved by providing a lane keep control method for an automotive vehicle, comprising: calculating a deceleration controlled variable on the basis of a state of a tendency of a vehicular deviation from a traffic lane on which the vehicle is traveling; and controlling a braking force acted upon each of driven wheels of the vehicle on the basis of the calculated deceleration controlled variable.

This summary of the invention does not necessarily describe all necessary feature so that the invention may also be a sub-combination of these described features.

BRIEF DESCRIPTION OF THE DRAWINGS

FIG. 2 is an flowchart representing a calculation processing executed by a braking/driving force controller shown in FIG. 1.

FIG. 3 is a control map representing a control map used in the calculation processing shown in FIG. 2.

DETAILED DESCRIPTION OF THE PREFERRED EMBODIMENTS

Reference will hereinafter be made to the drawings in order to facilitate a better understanding of the present invention.

(First Embodiment)

Figure 1:
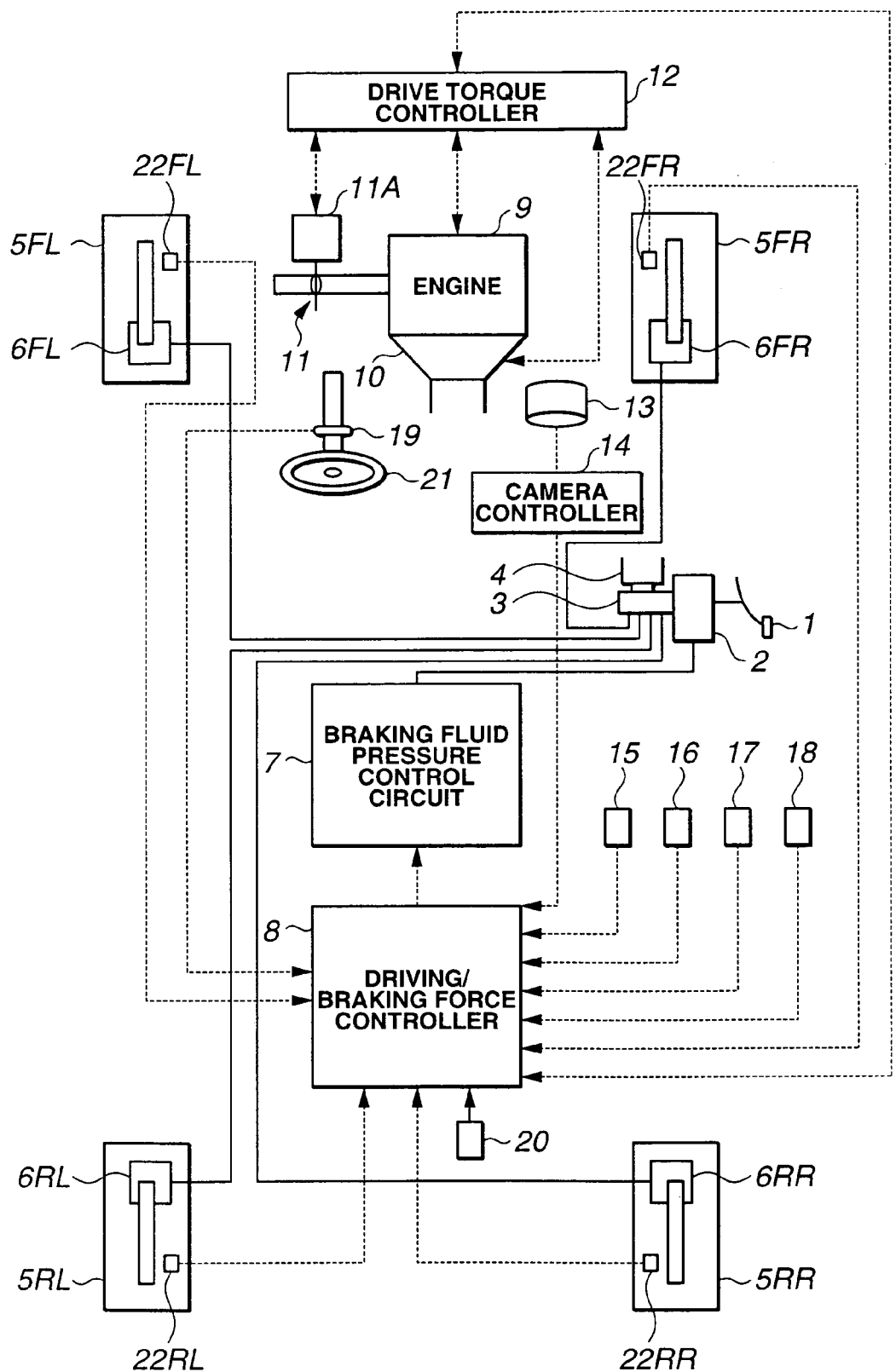
FIG. 1 is a rough configuration view of an automotive vehicle to which a lane keep control apparatus in a first preferred embodiment according to the present invention is applicable.

FIG. 1 shows a rough configuration view representing a first preferred embodiment of a lane keep control apparatus according to the present invention. A reference numeral 1 shown in FIG. 1 denotes a brake pedal, a reference numeral 2 denotes a booster, a reference numeral 3 denotes a master cylinder, and a reference numeral 4 denotes a reservoir. Ordinarily, a brake fluid pressure boosted by means of master cylinder 3 is supplied to each wheel cylinder 6FL through 6RR of each road wheel 5FL through 5RR (5FL denotes a front left road wheel, 5FR denotes a front right road wheel, 5RL denotes a rear left road wheel, 5RR denotes a rear right road wheel) in accordance with a depression quantity (depression depth) of brake pedal 1 with a vehicle driver. It becomes possible to control the brake fluid pressure of each wheel cylinder 6FL through 6RR by means of a braking fluid pressure control circuit 7 installed in master cylinder 3. This braking fluid pressure control circuit 7 also permits the brake fluid pressure control for respective wheel cylinders 6FL, 6FR, 6RL, and 6RR. Braking fluid pressure control circuit 7 is a utilization of a braking fluid pressure control circuit used in an ACC (Adaptive Cruise Control) to maintain, for example, an inter-vehicle distance of the vehicle to a preceding vehicle constant. The preceding vehicle is another vehicle which is traveling in front of the vehicle (also called, a host vehicle) on the same traffic lane as the vehicle. It is possible to control the braking fluid pressure of each wheel cylinder 6FL through 6RR individually (solely). However, when a braking fluid pressure command value is inputted from a braking/driving force control unit (controller) 8, braking fluid pressure control circuit 7 controls the braking fluid pressure for each of the wheel cylinders 6FL through 6RR in accordance with the braking fluid pressure command value. As described above, in the first embodiment, since a relatively inexpensive braking fluid pressure control circuit (a control type negative pressure booster) which is available and becomes popular in ACC is used, a manufacturing cost of the lane keep control apparatus can be reduced and the traffic lane keep control apparatus can inexpensively be formed within the vehicle.

Figure 12A:
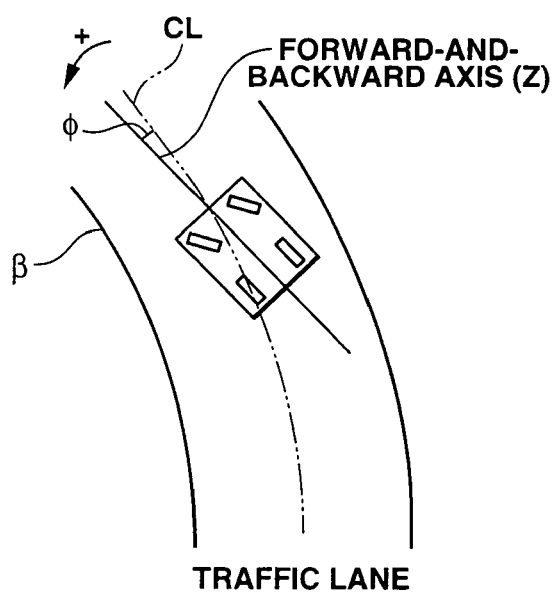
FIGS. 12A and 12B are explanatory views for explaining an acute angle $\phi$ formed between a traffic lane on which the vehicle is traveling and a forward-and-backward axis of the vehicle and a deviation quantity of a lateral displacement X of the vehicle with respect to the traffic lane.
Figure 12B:
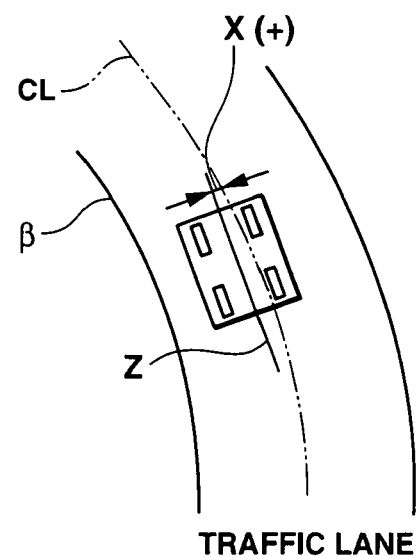

A driving torque controller 12 is installed in the vehicle which controls a driving torque to driven wheels, viz., rear road wheels 5RL and 5RR by adjustably controlling a driving state of an engine 9, a selected gear ratio of an automatic transmission 10, and a throttle opening angle of a throttle valve 11 in an intake air system of engine 9. The driving state of engine 9 can be controlled according to a fuel injection quantity, an ignition timing, and, at the same time, according to a control over an opening angle of throttle valve 11 (a reference numeral 11A denotes a throttle actuator to actuate throttle valve). It is noted that, although this drive torque controller 12 can solely control the drive torques of rear road wheels 5RL and 5RR, the driven wheels' torques are controlled in accordance with a drive torque command value when the drive torque command value is inputted to drive torque controller 12 from driving/braking force controller 8. In addition, a CCD (Charge Coupled Device) camera 13 and a camera controller 14 are disposed on the vehicle to detect a position of the vehicle within a traffic lane for detecting a traffic lane deviation tendency state detection. Camera controller 14, from among photographed images in a forward photographing zone trapped by CCD camera 13, for example, detects a forward traffic lane on which the vehicle is to travel (or is traveling) by detecting lane markers such as white lines, and calculates an acute angle ϕ formed between the traffic lane on which the vehicle is traveling and a forward-and-backward axis (Z) of the vehicle (also called, a longitudinal axis of the vehicle passing through a weight center of the vehicle (actually, camera 13) as shown in FIG. 12A, a lateral displacement X of the vehicle with respect to a traffic lane center CL as shown in FIG. 12B, and a traffic lane curvature β (curvature of the traffic lane on which the vehicle is traveling), and so forth as will be described later. It is noted that this acute angle ϕ defined as described above is, hereinafter, also simply referred to as acute angle ϕ formed therebetween).

In addition, an acceleration sensor 15 to detect a longitudinal acceleration Xg and a lateral acceleration Yg developed on the vehicle, a master cylinder pressure sensor 17 to detect an output pressure of master cylinder 3, so-called, a master cylinder pressure Pm, an accelerator opening angle sensor 18 to detect the depression quantity of the accelerator pedal, namely, an accelerator opening angle Acc, a steering angle sensor 19 that detect a steering angular displacement (steering angle) δ of a steering wheel 21, road wheel speed sensors 22FL through 22RR to detect revolution speeds of the respective road wheels 5FL through 5RR, i.e., road wheel velocities Vwi (i=FL through RR), and a direction indicator switch 20 to detect a direction indicative operation by means of a direction indicator. These detection signals are supplied and inputted to braking/driving force controller 8.

Acute angle ϕ formed between the traffic lane and forward-and-backward axis of the vehicle detected by camera controller 14, a lateral displacement X from the center of the traffic lane, traffic lane curvature β, a forward-and-rearward distance Lx to an obstacle detected by a radar controller 16, a lateral distance of the obstacle Ly, and a width Hs of the obstacle, and the drive torque Tw controlled by drive torque controller 12 are supplied and inputted to driving/braking force controller 8. If a directivity (left and right) on the detected vehicular running state data is present, a leftward direction with respect to a vehicle body is assumed to be a positive direction and a rightward direction with respect to the vehicle body is assumed to be a negative direction. That is to say, a yaw rate Φ', lateral acceleration Yg, and yaw angle Φ are assumed to have positive values for a leftward turning of the vehicle and lateral displacement X is assumed to have the positive value when the forward-and-backward axis (Z) is deviated (offset) in the leftward direction with respect to center line CL of the traffic lane (refer to FIG. 12B).

Next, FIG. 2 shows a calculation processing executed by driving/braking force controller 8 shown in FIG. 1. This calculation processing is executed as a timer interrupt routine for each predetermined sampling time ΔT for, for example, 10 milliseconds. It is noted that a step for a communication is not provided but the information obtained by the calculation processing is temporarily updated and stored into a memory and the necessary information is read at any time from the memory.

At a step S1, driving/braking force controller 8 reads various kinds of data from each sensor, the controller, and the control circuit (control unit). Specifically longitudinal acceleration Xg of the vehicle, lateral acceleration Yg thereof, yaw rate Φ' thereof, each road wheel velocity Vwi thereof, steering angle δ thereof, accelerator opening angle Acc thereof, master cylinder pressure Pm thereof, direction indication signal (a turn signal lamp) switch signal, and drive torque Tw from driving torque controller 12, acute angle ϕ formed therebetween from camera controller 14, lateral displacement X of the vehicle from center line CL of the traffic lane on which the vehicle is traveling from camera controller 14, and curvature β of the traffic lane from camera controller 14.

At the next step S2, driving/braking force controller 8 calculates a future estimated lateral displacement XS. Specifically, driving/braking force controller 8 calculates future estimated lateral displacement XS in accordance with the following equation (1) on the basis of acute angle ϕ formed therebetween, lateral displacement X of the vehicle from the center line CL of the traffic lane, traffic lane curvature β, and traveling velocity V which is an average value of front left and right road wheel velocities $V_{wFL}$ and $V_{wFR}$ which are non-driven wheels.

$$XS = Tt \times V \times (\phi + Tt \times V \times \beta) + X \qquad (1).$$

It is noted that, in equation (1), Tt denotes a headway time for calculating a forward gazing distance. That is to say, if headway time Tt is multiplied by traveling velocity V, this results in a forward gazing distance. In details, a lateral displacement estimated value of the vehicle from the center line CL of the traffic lane after headway time Tt has passed indicates the future estimated lateral displacement XS.

At the next step S3, driving/braking force controller 8 determines whether the vehicle has the state of a tendency of the vehicular deviation (divergence) from the traffic lane. Specifically, driving/braking force controller 8 determines whether the calculated future lateral displacement XS at step S2 is equal to or larger than a lateral displacement limit value Xc. If future estimated lateral displacement XS is equal to or larger than lateral displacement limit value Xc, the vehicle has the state of the tendency of diverging (deviation) from the traffic lane (toward a leftward direction from the traffic lane). It is noted that, as shown in FIG. 3, divergence (deviation) determination threshold value, i.e., lateral displacement limit value Xc indicates a relatively large constant value in a region in which an absolute value |φ| of acute angle φ formed therebetween is relatively small (narrow)(smaller than a predetermined small value). In a region in which absolute value |φ| described above is relatively large (is equal to or larger than a predetermined large value), divergence (deviation) determination threshold value Xc is a relatively small constant value. In an intermediate region between these regions, along with an increase in absolute value of absolute value |φ|, divergence determination threshold value Xc is decreased in a linear (straight line) manner (linearly).

Figure 4:
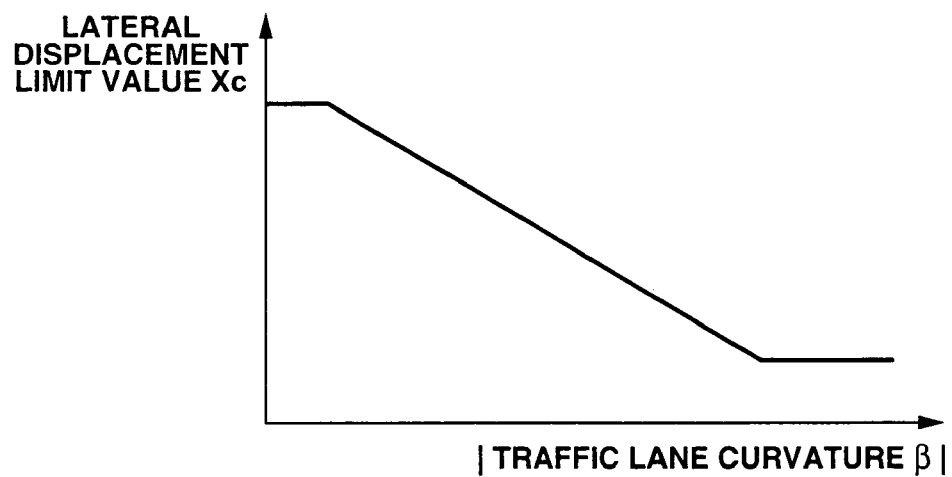
FIG. 4 is a variation of the control map shown in FIG. 3.

In the first embodiment, when absolute value |φ| of acute angle φ formed therebetween of the vehicle becomes large, deviation determination threshold value Xc is set to be small, deviation determination flag FLD is set to "1" at an early timing. Thus, traveling velocity V of the vehicle becomes small (slow) at the early timing. In the first embodiment, divergence determination flag FLD is set to "1" at the early timing so that traveling velocity V of the vehicle becomes small (slow) at the early timing. In the first embodiment, divergence (or deviation) determination threshold value Xc is set on the basis of absolute value |φ| of acute angle φ formed therebetween. However, divergence (deviation) determination threshold value Xc is not limited to this. For example, divergence determination threshold value Xc may be set on the basis of absolute value |β| of curvature β of the traffic lane. In this case, deviation determination threshold value Xc is set to provide a relatively large constant value in a region in which absolute value |β| of curvature β of traffic lane is relatively small (smaller than a predetermined small value of absolute value |β| of curvature β). In a region in which absolute value |β| of curvature β is relatively large (equal to or larger than a predetermined large value), lateral displacement limit value Xc is set to provide a relatively small constant value, as shown in FIG. 4. In an intermediate region between these regions, divergence determination threshold value Xc is linearly decreased along with the increase of absolute value |β| of curvature of the traffic lane. In addition, if future estimated lateral displacement XS is smaller than lateral displacement limit value Xc, driving/braking force controller 8 determines whether the future estimated lateral displacement XS is equal to or smaller than an inverted value (−Xc) of a sign of lateral displacement XS of lateral displacement limit value Xc, deviation determination flag FLD is set to "1", namely, the vehicle tends to be deviated toward the rightward direction tendency from the traffic lane on which the vehicle is traveling.

Furthermore, if the future lateral displacement XS is smaller than lateral displacement limit value Xc and is larger than a value (−Xc) which is a sign inverted value to the sign of lateral displacement limit value Xc, deviation determination flag FLD is reset to "0", namely, to indicate that the vehicle has the state of no tendency of the divergence (deviation) from the traffic lane.

Next, at step S4, driving/braking controller 8 calculates a deceleration controlled variable Pg. Specifically, driving/braking controller 8 determines whether deviation determination flag FLD set at step S3 is set to "1". In a case where the vehicle has the tendency of deviation from traffic lane, driving/braking force controller 8 calculates deceleration controlled variable Pg in accordance with the following equation (2). If not so, deceleration controlled variable Pg is set to "0".

$$Pg = Kv1 \times Ks \times Ky \times (|XS| - Xc) \qquad (2).$$

Figure 5:
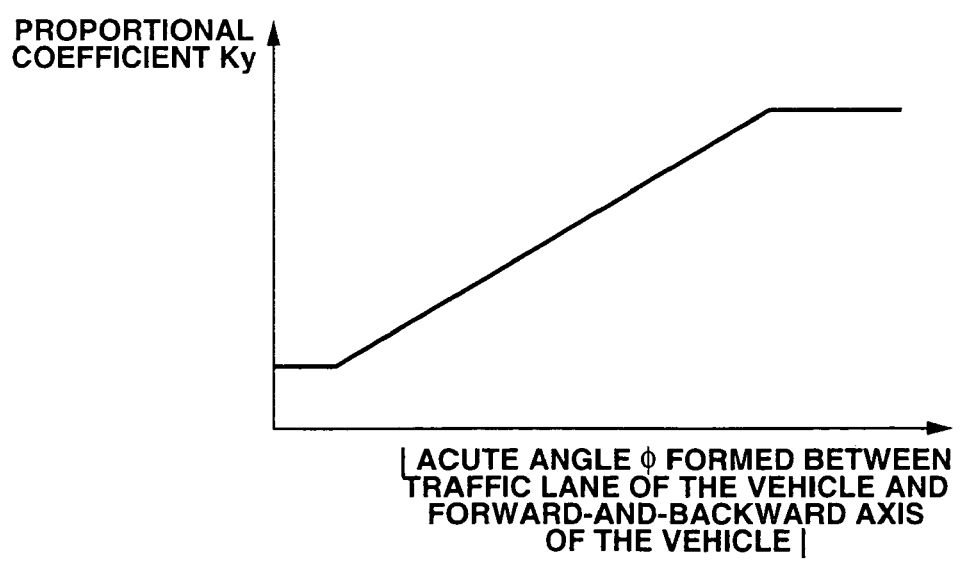
FIG. 5 is a control map used in the calculation processing in the lane keep control apparatus of the first embodiment shown in FIG. 2.

In equation (2), Kv1 denotes a proportional coefficient determined from vehicle specifications, Ks denotes a proportional coefficient determined from traveling speed V of the vehicle, Ky denotes a proportional coefficient determined from acute angle φ formed therebetween. Proportional coefficient Ky, as shown in FIG. 5, is set to provide a relatively small constant value in a region in which absolute value |φ| of acute angle formed therebetween is relatively small (smaller than a predetermined small value of absolute value |φ|, is set to provide a relatively large constant value in a region in which absolute value |φ| of acute angle formed therebetween is relatively large (equal to or larger than a predetermined large value), and is set to become linearly increased along with the increase of absolute value |φ| of acute angle φ formed therebetween in an intermediate region between these regions. That is to say, as absolute value of |φ| of acute angle φ formed between the traffic lane on which the vehicle is traveling and forward-and-rearward axis (Z) of the vehicle becomes large, deceleration controlled variable Pg is largely calculated and traveling velocity of V of the vehicle is remarkably reduced.

Figure 6:
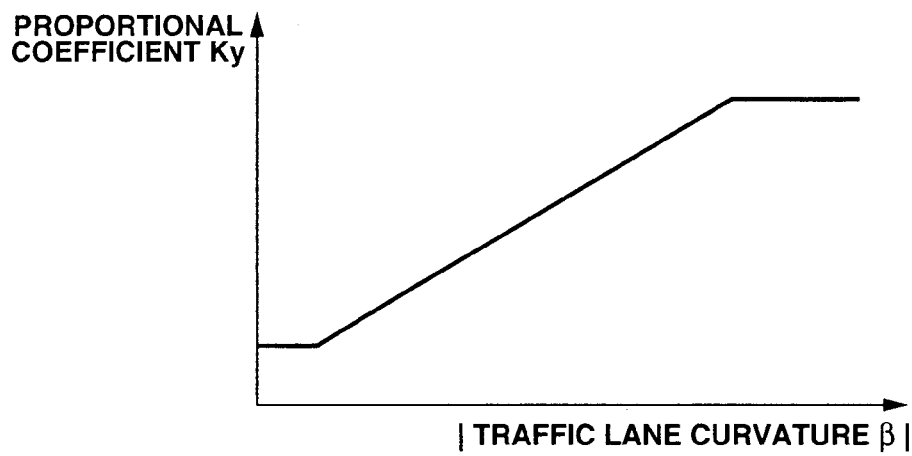
FIG. 6 is a variation of the control map shown in FIG. 5.

It is noted that proportional coefficient Ky is set on the basis of an absolute value |φ| of the acute angle formed between the traffic lane on which the vehicle is traveling and the forward-and-backward axis of the vehicle. However, proportional coefficient Ky may, alternatively, be set on the basis of, for example, absolute value |β| of traffic lane curvature β. In this case, proportional coefficient Ky is set, as shown in FIG. 6, in such a manner that, in a region in which absolute value |β| of curvature β of the traffic lane on which the vehicle is traveling is relatively small (smaller than a predetermined small value) to provide a relatively small constant value, in a region in which absolute value |β| of curvature β of the traffic lane on which the vehicle is traveling is relatively large (equal to or larger than a predetermined large value) to provide a relatively large constant value, and is set to be linearly increased along with the increase in absolute value |β| in an intermediate region between these regions.

At the next step S5, a target braking fluid pressure of each road wheel on the basis of deceleration controlled variable Pg calculated at step S4 is calculated. The braking fluid pressure command value for the target braking pressure is outputted to braking fluid pressure control circuit 7. Then, the routine returns to a main routine.

Next, an operation of the lane keep control apparatus according to the present invention under a specific situation of the vehicular traveling will be described below.

First, suppose that the vehicle runs on a sharp curved road and acute angle φ formed therebetweeen (formed between traffic lane of the vehicle and the forward-and-backward axis of the vehicle) becomes large (wide) so that the tendency of the vehicle deviated from the traffic lane becomes high. Thus, in the arithmetic processing of driving/braking force controller 8, as shown in FIG. 2, various data from each sensor, the controller, and the control unit are read at step S1 and future estimated lateral displacement XS is largely calculated at step S2, and divergence (deviation) determination threshold value Xc is set to be small as shown in FIG. 3. Suppose herein that lateral displacement limit value Xc is set to be smaller than future estimated lateral displacement XS. At this time, at step S3, at the early timing, divergence determination flag FLD is set to be "1". That is to say, the vehicle indicates the occurrence of the deviation tendency from the traffic lane. At step S4, proportional coefficient Ky is largely calculated, as shown in FIG. 5. At step S5, the braking fluid pressure command value is outputted to braking fluid pressure control circuit 7. Then, when the braking fluid pressure command value is obtained by means of the braking fluid pressure control circuit 7, the target braking fluid pressure is outputted to each road wheel and the vehicle is largely decelerated. Therefore, traveling speed V of the vehicle is remarkably slowed at the early timing. A time for the vehicle to be deviated from the traffic lane, namely, a time for the vehicle driver to enable an operation of steering wheel 21 to avoid the deviation of the traffic lane becomes long. In addition, a turning radius of the vehicle becomes small. Consequently, a traffic lane deviation performance of the vehicle is improved. It is noted that even if an appropriate steering operation is not carried out by the vehicle driver and the vehicle traveling route is deviated from the traffic lane, there is sufficiently small possibility (almost no possibility) that the vehicle is collided against the obstacle which is located outside of the traffic lane on which the vehicle is traveling since the traveling speed (velocity) V of the vehicle is made slow (low).

(Second Embodiment)

Next, a second preferred embodiment of the lane keep control apparatus according to the present invention will be described below. A difference point from the first embodiment described above is that future estimated lateral displacement XS is calculated on the basis of traffic lane curvature β and a vehicular turning curvature βv and, on the basis of future estimated lateral displacement XS, the state of the tendency of the vehicular deviation from the traffic lane is detected.

Figure 7:
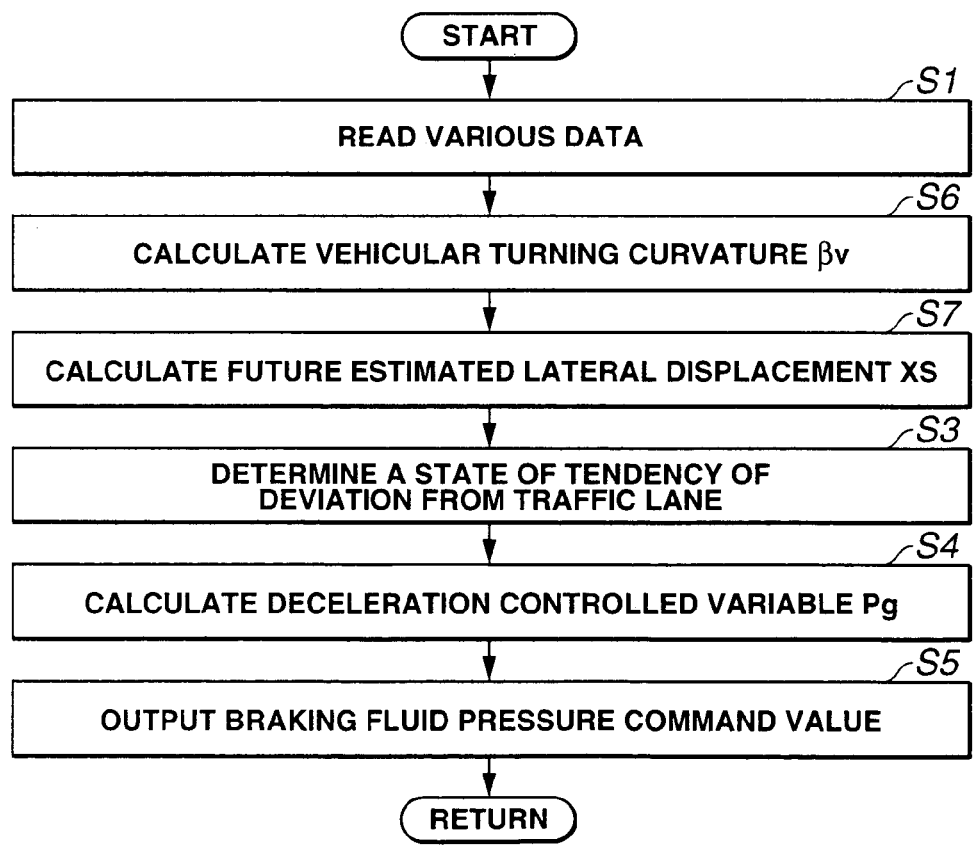
FIG. 7 is an operational flowchart representing a calculation processing executed in the driving/braking force controller shown in FIG. 1 in the lane keep control apparatus in a second preferred embodiment according to the present invention.

Specifically, step S2 of the calculation processing shown in FIG. 2 executed by driving/braking force control unit (controller) 8 is modified to steps S6 and S7 of another calculation processing of FIG. 7 executed in the second embodiment. In details, at step S6, vehicular turning curvature βv is calculated in accordance with the following equation (3) on the basis of steering angle δ read at step S1 and traveling speed V of the vehicle calculated at step S2. That is to say, $$\beta v = Kv2 \times \delta / N \qquad (3).$$

It is noted that Kv2 denotes a proportional coefficient determined according to the vehicle specifications.

At the next step S7, driving/braking force controller 8 calculates future estimated lateral displacement XS. Specifically, future estimated lateral displacement XS is calculated in accordance with the following equation (4) on the basis of the curvature βv of the traffic lane on which the vehicle is traveling and traveling velocity V of the vehicle read at step S1 and vehicular turning curvature βv calculated at step S6. It is noted that vehicular traveling velocity V is an average value of front left and right road wheel velocities VwFL and VwFR which are non-driven wheels from among respective road wheel velocities Vwi read at step S1.

$$XS = Tt \times V \times (Tt \times V \times \Delta\beta) + X \qquad (4).$$

It is noted that Δβ is a difference (β−βv) between curvature β of the traffic lane on which the vehicle is traveling and vehicular turning curvature βv. In details, in this embodiment, on the basis of the difference between traffic lane curvature β and vehicular turning curvature βv, namely, in order to calculate a future estimated lateral displacement XS, future estimated lateral displacement XS can accurately be determined and the deviation tendency of the vehicle from the traffic lane can accurately be calculated.

It is noted that, in this embodiment, traffic lane curvature β is detected with CCD camera 13 and camera controller 14. The detection of curvature β of the traffic lane is not limited to this. The detection of traffic lane curvature β may, alternatively, be detected by a car navigation system mounted in the vehicle or a road-and-car communication with an infra-structure. Future estimated lateral displacement XS can accurately be calculated and the traffic lane deviation tendency of the vehicle can accurately be calculated.

Next, the operation of the traffic lane keep control apparatus according to the present invention will be described on the basis of a specific situation of the vehicular traveling. First, suppose that, during the vehicular run on a sharp curved road, a turning radius of the vehicle is larger than a radius of curvature of the lane on which the vehicle is traveling. Then, suppose that the tendency of the vehicular deviation from the traffic lane is increased. At this time, in the calculation processing of driving/braking force controller 8, at step S6 via step S1 vehicular turning curvature β is calculated to be small. At step S7 traffic lane curvature β is calculated to be large. Suppose that traffic lane curvature β on which the vehicle is traveling is calculated to be larger than vehicular turning curvature βv. At this time, at step S7, future estimated lateral displacement XS is largely calculated. As shown in FIG. 3, divergence (deviation) determination threshold value Xc is set to provide a relatively large constant value in a region in which the absolute value of acute angle φ formed therebetween is smaller than a predetermined small value, is set to provide a relatively small constant value in a region in which the absolute value of acute angle φ formed therebetween is equal to or larger than a predetermined large value, and is set to be linearly decreased along with the increase in the absolute value of the acute angle φ formed therebetween. At step S3, since lateral displacement limit value (deviation determination threshold value) Xc is set to be smaller than future estimated lateral displacement XS, at the early timing, deviation determination flag FLD is set to "1". In details, the present state is determined that the vehicle tends to be deviated from the traffic lane on which the vehicle is traveling. At step S4, proportional coefficient Ky is calculated to be large, as shown in FIG. 5. Then, deceleration controlled variable Pg is calculated to be large so that absolute value |XS| of future estimated lateral displacement XS is smaller than deviation determination threshold value Xc. At step S5, the braking fluid pressure command value is outputted to braking fluid pressure control circuit 7. At this time, the target braking fluid pressure is outputted to respective road wheel cylinders so that the vehicle is largely decelerated. Therefore, traveling velocity V of the vehicle becomes small (slow) at the earlier timing. The time duration for which the vehicle is deviated from the traffic lane, namely, the time duration for which the vehicle driver can manipulate steering wheel 21 so as to avoid the traffic lane deviation of the vehicle becomes long. In addition, the turning radius of the vehicle becomes accordingly small. Consequently, the deviation avoidance performance of the vehicle from the traffic lane on which the vehicle is traveling can be improved.

(Third Embodiment)

Next, a third preferred embodiment of the lane keep control apparatus according to the present invention will be described below. The difference point in the third embodiment from the first embodiment described above is that, without calculation of future estimated lateral displacement XS, on the basis of traffic lane curvature β and vehicular turning curvature βv, the state of the tendency of the vehicular deviation from the traffic lane is detected. Specifically, steps S2 through S4 of the calculation processing shown in FIG. 2 executed by driving/braking force controller 8 in the first embodiment are modified to steps S8 through S11 shown in FIG. 8 executed in the third embodiment.

Figure 8:
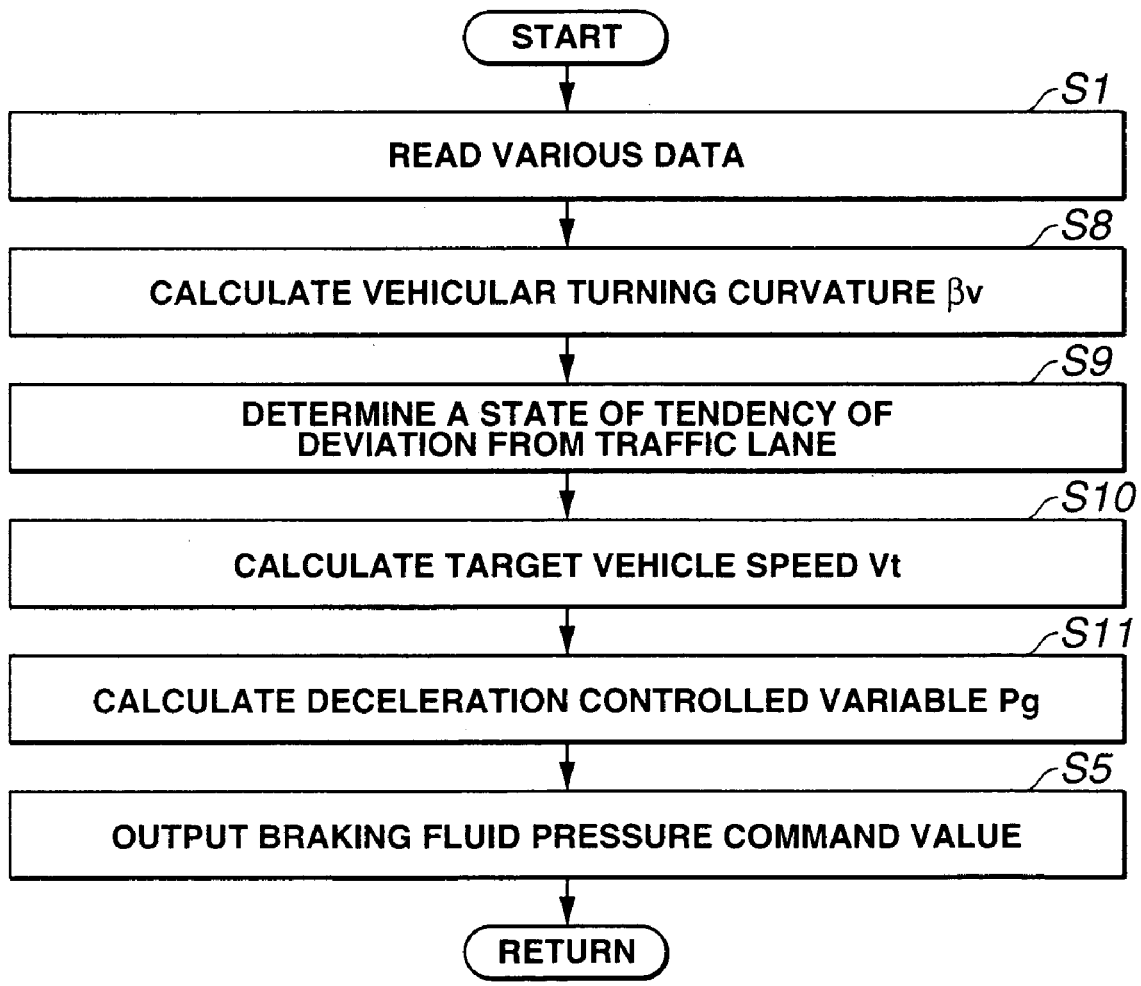
FIG. 8 is an operational flowchart executed within the driving/braking force controller shown in FIG. 1 in a third preferred embodiment of the lane keep control apparatus according to the present invention.

In details, at step S8 in FIG. 8, driving/braking force controller 8 calculates vehicular turning curvature βv in accordance with the above-described equation (3) on the basis of steering angle δ read at step S1 (shown in FIG. 8) and traveling speed (velocity) V calculated at step S2 (shown in FIG. 2). At the next step S9, driving/braking force controller 8 determines whether the state of the tendency of the vehicular deviation from the traffic lane occurs.

Figure 9:
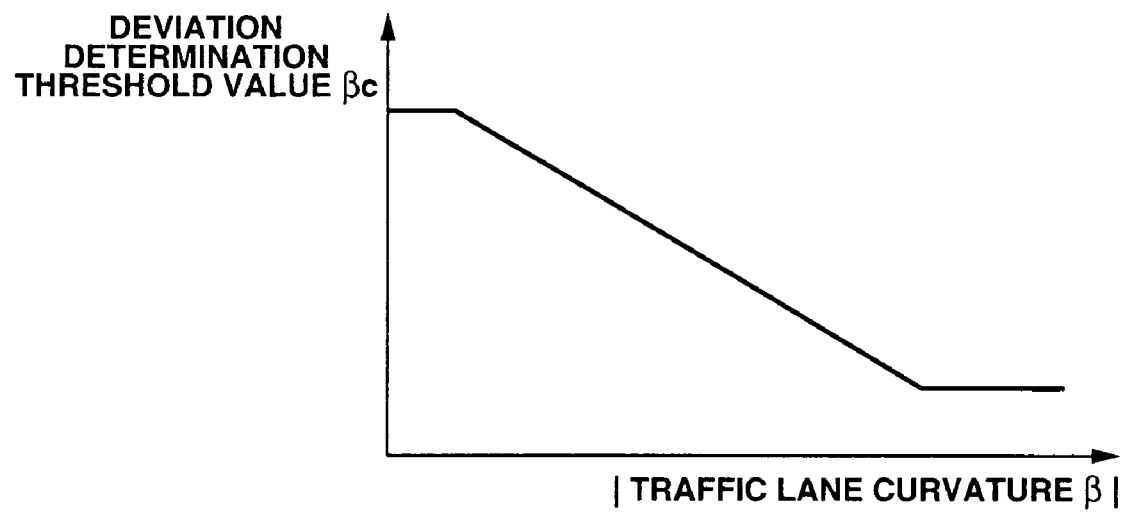
FIG. 9 is a control map used in the calculation processing shown in FIG. 8.

Specifically, curvature β of the traffic lane detected at step S1 is equal to or larger than zero (0) and driving/braking force controller 8 determines whether the difference (β−βv) of traffic lane curvature β detected at step S1 and vehicular turning curvature βv calculated at step S8 is equal to or larger than deviation determination threshold value, viz., in this embodiment, a difference deviation determination threshold value βc. If traffic lane curvature β is equal to or larger than zero (0) and the difference (β−βv) is equal to or larger than difference deviation determination threshold value βc, the deviation determination flag FLD is set to "1". That is to say, driving/braking force controller 8 determines that the vehicle has the state of the tendency of the vehicular deviation from the traffic lane toward the leftward direction. It is noted that difference deviation determination threshold value βc is set to provide a relatively large constant value in a region in which absolute value |β| of traffic lane curvature β is relatively small (equal to or smaller than a predetermined small value), as shown in FIG. 9, is set to be a relatively small constant value in a region in which absolute value |β| of traffic lane curvature β is relatively large (equal to or larger than a predetermined large value), and is set to linearly be decreased in an intermediate region between these regions along with the increase in absolute value of |β| of curvature β of the traffic lane.

When, as described above, in the third embodiment, absolute value |β| of traffic lane curvature on which the vehicle is traveling is large, deviation determination threshold value βc is calculated to be small. Hence, deviation determination flag FLD is set to "1" at the early timing. In addition, traveling velocity V of the vehicle becomes small (slow) at the early timing.

On the other hand, if curvature β of traffic lane on which the vehicle is traveling is neither equal to nor larger than "0" (zero) and difference (β−βv) is not equal to or larger than deviation determination threshold value βc, driving/braking force controller 8 determines whether traffic lane curvature β on which the vehicle is traveling is smaller than zero (0) and determines whether difference (β−βv) is equal to or smaller than the inverted value (−βc) of a sign of deviation determination threshold value βc. If curvature β of the traffic lane on which the vehicle is traveling is equal to or smaller than zero (0) and is equal to or smaller than the inverted value (−βc) of the sign of deviation determination threshold value βc, driving/braking force controller 8 sets deviation determination flag FLD to "1", namely, indicates such a state that the vehicle has entered the state of the tendency of the vehicular deviation toward the rightward direction from the traveling traffic lane.

Furthermore, if curvature β of the traffic lane on which the vehicle is traveling is smaller than zero (0) and difference (β−βv) is not equal to or lower than inverted value of (−βc) whose sign of deviation determination flag FLD is in reset state of "0", namely, driving/braking force controller 8 indicates the state such that the vehicle does not have the tendency of vehicular deviation from the traffic lane.

At the next step S10, driving/braking force controller 8 calculates a target vehicular velocity (speed) Vt. Specifically, driving/braking force controller 8 calculates target vehicular velocity Vt in accordance with the following equation (5) on the basis of curvature β of the traffic lane on which the vehicle is traveling and steering angle δ read at step S1 and deviation determination threshold value βc calculated at step S9.

$$Vt = Kv2 \times \delta / (|\beta| - \beta c) \quad (5).$$

Next, at step S11, driving/braking force controller 8 calculates deceleration controlled variable Pg. Specifically, driving/braking force controller 8 determines whether deviation determination flag FLD set at step S9 is in the set state of "1" (namely, a state in which the vehicle has the state of the tendency of the vehicular deviation from the traffic lane). If flag FLD is in the set state, deceleration controlled variable Pg is calculated in accordance with equation (6) on the basis of target vehicle speed Vt calculated at step S10 and traveling speed V of the vehicle calculated at step S6.

$$Pg = Kt \times (V - Vt) \quad (6).$$

Figure 10:
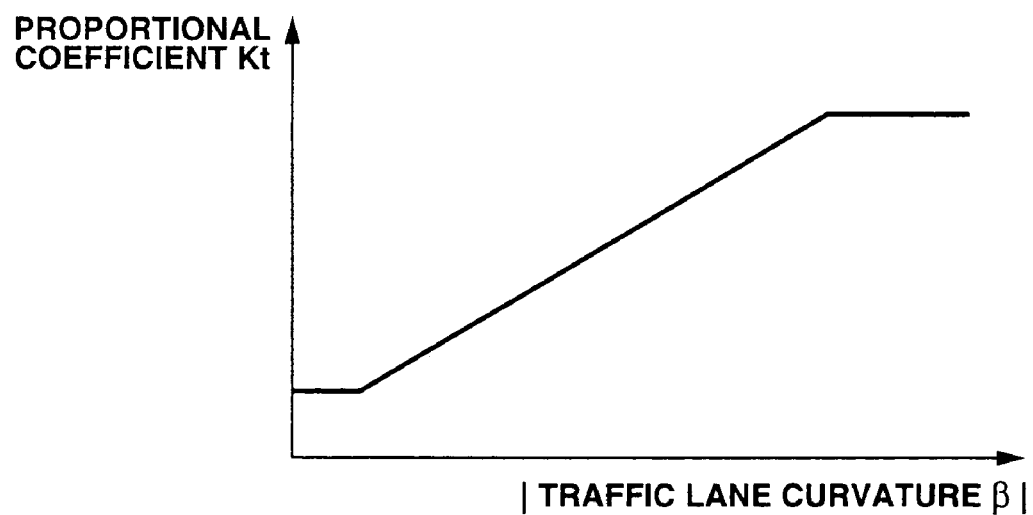
FIG. 10 is a control map used in the calculation processing shown in FIG. 8.

It is noted that Kt denotes a proportional coefficient. This proportional coefficient Kt is, as shown in FIG. 10, set to have a relatively small constant value in a region in which absolute value |β| of curvature β of the traffic lane on which the vehicle is traveling is relatively small (equal to or smaller than a predetermined small value) and is set to provide a relatively large constant value in the region in which absolute value |β| of curvature β of the traffic lane on which the vehicle is traveling is relatively large (equal to or larger than a predetermined large value). In an intermediate region between these regions, proportional coefficient Kt is set to be increased linearly along with an increase in the absolute value |β| of curvature β of the traffic lane on which the vehicle is traveling. That is to say, as absolute value |β| of curvature of the traffic lane becomes large, deceleration controlled variable Pg is calculated to be large and traveling speed V of the vehicle is remarkably decreased.

It is noted that, in this embodiment, proportional coefficient Kt is set on the basis of absolute value |β| of the curvature of the traffic lane on which the vehicle is traveling.

Figure 11:
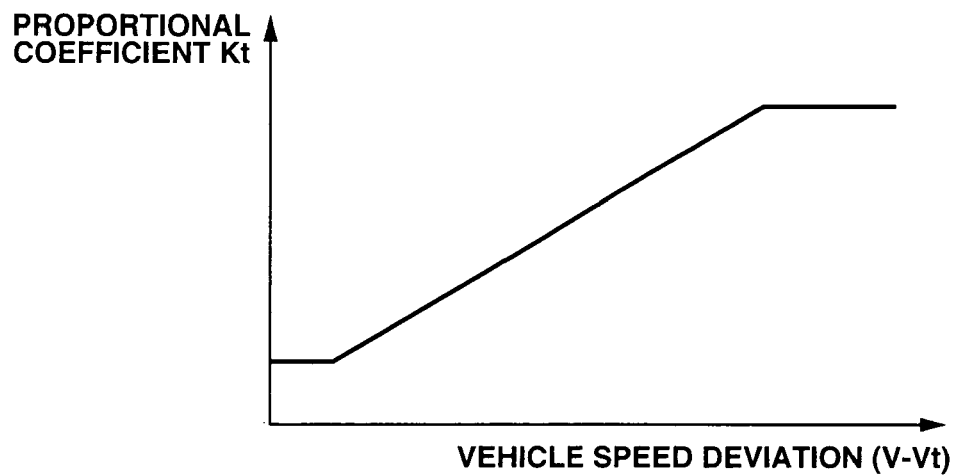
FIG. 11 is a variation of the control map of FIG. 10 used in the calculation processing shown in FIG. 8.

However, proportional coefficient Kt may not set only on the basis of this absolute value |β| of curvature of the traffic lane. For example, proportional coefficient Kt may, alternatively, be set on the basis of a difference (a vehicle speed deviation (V−Vt)) between traveling speed V and target vehicle speed Vt of the vehicle. In this case, proportional coefficient Kt is set, as shown in FIG. 11, to provide a relatively small constant value in a region in which the vehicle speed deviation (V−Vt) is relatively small (smaller than a predetermined small value of the vehicle speed deviation) and is set to provide a relatively large constant value in a region in which the vehicle speed deviation (V−Vt) is relatively large (equal to or larger than a predetermined large value of the vehicle speed deviation). In an intermediate region between these regions, proportional coefficient Kt is set to linearly be increased along with the increase in the vehicle speed deviation (V−Vt).

It is noted that if deviation determination flag FLD is in the reset state of "0" (a state in which the vehicle has the state of no tendency of the divergence (deviation) from the traffic lane on which the vehicle is traveling), deceleration controlled variable Pg is set to "0" (zero).

Next, an operation of the lane keep control apparatus in the third embodiment according to the present invention will be described on the basis of a specific situation of the vehicular traveling.

Suppose that, during the vehicular travel on the sharp curved road, the turning radius of the vehicle becomes larger than the radius of curvature of the traffic lane and the tendency of the deviation from the traffic lane is increased. At this time, in the calculation processing of driving/braking force controller 8, as shown in FIG. 8, at step S8 via step S1, vehicular turning curvature βv is calculated to be a small value. At step S9, as shown in FIG. 9, deviation determination threshold value βc is calculated to be small on the basis of large curvature β of the traffic lane. Suppose, then, that a value of vehicular turning curvature βv subtracted from traffic lane curvature β of the traffic lane is calculated to be larger than deviation (divergence) determination threshold value βc. At this time, at step S9, deviation determination flag FLD is set to "1" at the early timing. Namely, such a state that the vehicle has the tendency of the deviation from the traffic lane on which the vehicle was traveling occurs. At step S10, target vehicle speed (velocity) Vt is calculated to be small. At step S11, proportional coefficient Kt is calculated to be large, as shown in FIG. 10. Deceleration controlled variable Pg is accordingly calculated to be large so that traveling speed V of the vehicle becomes smaller than target vehicle speed Vt. At step S5, the braking fluid pressure command value is outputted to braking fluid pressure control circuit 7.

When the braking fluid pressure command value is obtained by braking fluid pressure control circuit 7, the target braking fluid pressure is outputted to each road wheel cylinder 6FL through 6RR and the vehicle is largely decelerated. Therefore, the traveling speed V of the vehicle is remarkably small (slowed) at the early timing. The time deviation for which the vehicle is deviated from the traffic lane on which the vehicle was traveling, namely, the time duration for which the vehicle driver can manipulate steering wheel 21 (perform the steering operation) becomes long and the turning radius of the vehicle becomes small. Consequently, the deviation avoidance performance of the vehicle is improved.

In each of the first, second, and third embodiments, each sensor of FIG. 1 and camera controller 14, each step S1 shown in FIGS. 2, 7, and 8 constitutes a traveling information detecting section. Master cylinder 3, braking fluid pressure control circuit 7, steps S4 and S5 shown in FIGS. 2 and 7, respectively, and steps S5 and S11 shown in FIG. 8 constitute braking force controlling section. It is noted that the vehicle used in the specification is an automotive vehicle in which the lane keep control apparatus according to the present invention is mounted (so called, the host vehicle).

Various changes and modifications of the lane keep control apparatus and method according to the present invention can be made without departing from the sprit and scope of the appended claims. The entire contents of a Japanese Patent Application No. 2003-078661 (filed in Japan on Mar. 20, 2003) are herein incorporated by reference. The scope of the invention is defined with reference to the following claims.

What is claimed is:

1. A lane departure prevention control apparatus for an automotive vehicle, comprising:
   a vehicular traveling information detecting section that detects an acute angle (φ) formed between a traffic lane on which the vehicle is traveling and a forward-and backward axis of the vehicle;
   a deviation tendency detecting section that detects a state of a tendency of vehicular deviation from the traffic lane on which the vehicle is traveling;
   a deceleration controlled variable calculating section that calculates a deceleration controlled variable on the basis of the state of the tendency of the vehicular deviation from the traffic lane on which the vehicle is traveling;
   a braking force controlling section that controls a braking force acted upon wheels of the vehicle on the basis of the calculated deceleration controlled variable; and
   a correcting section that corrects at least one of a parameter for detecting the state of the tendency of the deviation from the traffic lane on which the vehicle is traveling so as to detect lane deviation at an earlier timing, and a parameter for computing the calculated deceleration controlled variable so as to increase the calculated deceleration controlled variable, as the acute angle (φ) becomes larger.

2. A lane departure prevention control apparatus for an automotive vehicle as claimed in claim 1, wherein the vehicular traveling information detecting section detects at least one of a vehicular traveling state and a vehicular traveling environment, and wherein the deceleration controlled variable calculating section calculates the deceleration controlled variable on the basis of the state of the tendency of the vehicular deviation from the traffic lane of the vehicle on which the vehicle is traveling.

3. A lane departure prevention control apparatus for an automotive vehicle as claimed in claim 2, wherein the vehicular traveling information detecting section detects curvature of the traffic lane on which the vehicle is traveling and wherein the deviation tendency detecting section detects the state of the tendency of the vehicular deviation from the traffic lane on the basis of at least one of the acute angle formed between the traffic lane on which the vehicle is traveling and the forward-and-backward axis of the vehicle and the curvature of the traffic lane on which the vehicle is traveling.

4. A lane departure prevention control apparatus for an automotive vehicle as claimed in claim 2, wherein the lane departure prevention control apparatus further comprises a turning state detecting section that detects a turning state of the vehicle and wherein the deviation tendency detecting section detects the state of the tendency of the vehicular deviation from the traffic lane on which the vehicle is traveling on the basis of at least one of the vehicular traveling state and the traveling environment detected by the vehicular traveling information detecting section and on the basis of the vehicular turning state detected by the turning state detecting section.

5. A lane departure prevention control apparatus for an automotive vehicle as claimed in claim 4, wherein the vehicular traveling information detecting section detects a curvature of the traffic lane on which the vehicle is traveling, the turning state detecting section detects a vehicular turning curvature on the basis of at least one of a traveling speed of the vehicle, a steering angle thereof, and a yaw rate thereof, and the deviation tendency detecting section detects the state of the tendency of the vehicular deviation from the traffic lane on the basis of the curvature of the traffic lane detected by the vehicular traveling information detecting section and the vehicular turning curvature detected by the turning state detecting section.

6. A lane departure prevention control apparatus for an automotive vehicle as claimed in claim 5, wherein the deviation tendency detecting section calculates a future deviation quantity estimated value from the traffic lane on which the vehicle is traveling on the basis of the curvature of the traffic lane detected by the vehicular traveling information detecting section and the vehicular turning curvature detected by the vehicular turning state detecting section.

7. A lane departure prevention control apparatus for an automotive vehicle as claimed in claim 3, wherein the vehicular traveling information detecting section detects both of the acute angle ($\phi$) formed between the traffic lane on which the vehicle is traveling and the forward-and-backward axis of the vehicle and the curvature ($\beta$) of the traffic lane and the deviation tendency detecting section detects the state of the tendency of the vehicular deviation from the traffic lane on the basis of both of the acute angle ($\phi$) formed therebetween and the curvature ($\beta$) of the traffic lane on which the vehicle is traveling.

8. A lane departure prevention control apparatus for an automotive vehicle as claimed in claim 7, wherein the deviation tendency detecting section comprises: a future estimated lateral displacement calculating section that calculates a future estimated lateral displacement (XS) of the vehicle with respect to the traffic lane on the basis of a traveling speed (V) of the vehicle, the acute angle ($\phi$) formed between the traffic lane and the forward-and-backward axis of the vehicle, and the curvature ($\beta$) of the traffic lane; and a first determining section that determines whether a magnitude of the future estimated lateral displacement (XS) of the vehicle is equal to or larger than a deviation determination threshold value (Xc), wherein the deviation tendency detecting section detects the state of the tendency of the vehicular deviation from the traffic lane when the first determining section determines that the magnitude of the future estimated lateral displacement (XS) is equal to or larger than the deviation determination threshold value (Xc).

9. A lane departure prevention control apparatus for an automotive vehicle as claimed in claim 8, wherein the deviation determination threshold value (Xc) is a lateral displacement limit value which is set to provide a relatively large constant value in a first region in which an absolute value $|\phi|$ of the acute angle formed between the traffic lane and the forward-and-backward axis of the vehicle is smaller than a predetermined small value, is set to provide a relatively small constant value in a second region in which the absolute value $|\phi|$ of the acute angle formed therebetween is equal to or larger than a predetermined large value, and is set to be linearly decreased along with an increase in the absolute value $|\phi|$ of the acute angle formed therebetween in an intermediate region between the first and second regions.

10. A lane departure prevention control apparatus for an automotive vehicle as claimed in claim 8, wherein the deviation determination threshold value (Xc) is a lateral displacement limit value, which is set to provide a relatively large constant value in a first region in which an absolute value $|\beta|$ of the curvature of the traffic lane on which the vehicle is traveling is smaller than a predetermined small value, is set to provide a relatively small constant value in a second region in which the absolute value $|\beta|$ of the curvature of the traffic lane is equal to or larger than a predetermined large value, and is linearly decreased along with an increase of the absolute value $|\phi|$ of the acute angle formed therebetween in an intermediate region between the first and second regions.

11. A lane departure prevention control apparatus for an automotive vehicle as claimed in claim 8, wherein the deviation tendency detecting section further comprises a second determining section that determines whether the magnitude of the future estimated lateral displacement (XS) of the vehicle is smaller than zero and is smaller than an inverted value (−Xc) of a sign of the deviation determination threshold value (Xc) and wherein the deviation tendency detecting section detects the state of the tendency of the vehicular deviation from the traffic lane when the second determining section determines that the magnitude of the future estimated lateral displacement (XS) is smaller than zero and is smaller than the inverted value (−Xc) of the sign of the deviation determination threshold value (Xc).

12. A lane departure prevention control apparatus for an automotive vehicle as claimed in claim 11, wherein the deceleration controlled variable calculating section calculates the deceleration controlled variable on the basis of a first proportional coefficient (Kv1) determined from vehicular specifications, a second proportional coefficient (Ks) determined from the traveling velocity (V) of the vehicle, a third proportional coefficient (Ky) determined from the acute angle formed between the traffic lane and the forward-and-backward axis of the vehicle, an absolute value (|XS|) of the future estimated lateral displacement, and the deviation determination threshold value (Xc).

13. A lane departure prevention control apparatus for an automotive vehicle as claimed in claim 12, wherein the third proportional coefficient (Ky) is set to provide a relatively large constant value in a first region in which an absolute value ($|\phi|$) of the acute angle formed between the traffic lane and the forward-and-backward axis of the vehicle is equal to or larger than a predetermined large value, is set to be smaller than a predetermined small value in a second region in which the absolute value ($|\phi|$) of the acute angle formed between the traffic lane and the forward-and-backward axis of the vehicle is smaller than a predetermined small value, and is set to be linearly increased along with an increase of the absolute value ($|\phi|$) of the acute angle formed between the traffic lane and the forward-and-backward axis of the vehicle in an intermediate region between the first and second regions.

14. A lane departure prevention control apparatus for an automotive vehicle as claimed in claim 12, wherein the third proportional coefficient (Ky) is set to provide a relatively large constant value in a first region in which an absolute value ($|\beta|$) of the curvature of the traffic lane on which the vehicle is traveling is equal to or larger than a predetermined large value, is set to be smaller than a predetermined small value in a second region in which the absolute value ($|\beta|$) of the curvature (β) of the traffic lane is smaller than a predetermined small value, and is set to be linearly increased along with an increase of the absolute value (|φ|) of the acute angle formed between the traffic lane and the forward-and-backward axis of the vehicle in an intermediate region between the first and second regions.

15. A lane departure prevention control apparatus for an automotive vehicle as claimed in claim 1, wherein the braking force controlling section is adapted to determine a target braking fluid pressure based on the calculated deceleration controlled variable, and the lane departure prevention control apparatus is adapted to output the target braking fluid pressure to each road wheel of the vehicle to decelerate the vehicle.

16. A lane departure prevention control apparatus for an automotive vehicle, comprising:
    a vehicular traveling information detecting means for detecting an acute angle (φ) formed between a traffic lane on which the vehicle is traveling and a forward- and backward axis of the vehicle;
    a deviation tendency detecting means for detecting a state of a tendency of vehicular deviation from the traffic lane on which the vehicle is traveling;
    a deceleration controlled variable calculating means for calculating a deceleration controlled variable on the basis of a state of a tendency of a vehicular deviation from a traffic lane on which the vehicle is traveling;
    a braking force controlling means for controlling a braking force acted upon each of the driven wheels of the vehicle on the basis of the calculated deceleration controlled variable; and
    a correcting means for correcting at least one of a parameter for detecting the state of the tendency of the deviation from the traffic lane on which the vehicle is traveling so as to detect lane deviation at an earlier timing, and a parameter for computing the calculated deceleration controlled variable so as to increase the calculated deceleration controlled variable, as the acute angle (φ) becomes larger.

17. A lane departure prevention control apparatus for an automotive vehicle as claimed in claim 16, wherein the braking force controlling means is adapted to determine a target braking fluid pressure based on the calculated deceleration controlled variable, and the lane departure prevention control apparatus is adapted to output the target braking fluid pressure to each road wheel of the vehicle to decelerate the vehicle.

18. A lane departure prevention method for an automotive vehicle, comprising:
    detecting an acute angle (φ) formed between a traffic lane on which the vehicle is traveling and a forward-and-backward axis of the vehicle;
    detecting a state of a tendency of vehicular deviation from the traffic lane on which the vehicle is traveling;
    calculating a deceleration controlled variable on the basis of the state of the tendency of the vehicular deviation from the traffic lane on which the vehicle is traveling;
    controlling a braking force acted upon wheels of the vehicle on the basis of the calculated deceleration controlled variable; and
    correcting at least one of a parameter for detecting the state of the tendency of the deviation so as to detect lane deviation at earlier timing, and a parameter for computing the calculated deceleration controlled variable so as to increase the calculated deceleration controlled variable, as the acute angle (φ) becomes larger.

19. A lane departure prevention control method for an automotive vehicle as claimed in claim 18, further comprising determining a target braking fluid pressure based on the calculated deceleration controlled variable, and outputting the target braking fluid pressure to each road wheel of the vehicle to decelerate the vehicle.

20. A lane departure prevention control apparatus for an automotive vehicle, comprising:
    a deceleration controlled variable calculating section that calculates a deceleration controlled variable on the basis of a state of a tendency of a vehicular deviation from a traffic lane on which the vehicle is traveling; and
    a braking force controlling section that controls a braking force acted upon each of the driven wheels of the vehicle on the basis of the calculated deceleration controlled variable;
    wherein the deceleration controlled variable calculating section calculates the deceleration controlled variable on the basis of a proportional coefficient (Kt) and a difference (V−Vt) between a vehicular traveling velocity (V) and a calculated target vehicle velocity (Vt).

21. A lane departure prevention control apparatus for an automotive vehicle, comprising:
    deceleration controlled variable calculating means for calculating a deceleration controlled variable on the basis of a state of a tendency of a vehicular deviation from a traffic lane on which the vehicle is traveling; and
    braking force controlling means for controlling a braking force acted upon each of the driven wheels of the vehicle on the basis of the calculated deceleration controlled variable;
    wherein the deceleration controlled variable calculating means calculates the deceleration controlled variable on the basis of a proportional coefficient (Kt) and a difference (V−Vt) between a vehicular traveling velocity (V) and a calculated target vehicle velocity (Vt).

22. A lane departure prevention control method for an automotive vehicle, comprising:
    calculating a deceleration controlled variable on the basis of a state of a tendency of a vehicular deviation from a traffic lane on which the vehicle is traveling; and
    controlling a braking force acted upon each of the driven wheels of the vehicle on the basis of the calculated deceleration controlled variable;
    wherein the calculating of the deceleration controlled variable is performed on the basis of a proportional coefficient (Kt) and a difference (V−Vt) between a vehicular traveling velocity (V) and a calculated target vehicle velocity (Vt).

* * * * *